(12) United States Patent
Blanchard et al.

(10) Patent No.: US 8,864,458 B2
(45) Date of Patent: Oct. 21, 2014

(54) FIXED VANE ASSEMBLY FOR A TURBINE ENGINE HAVING A REDUCED WEIGHT, AND TURBINE ENGINE COMPRISING AT LEAST ONE SUCH FIXED VANE ASSEMBLY

(75) Inventors: Stephane Pierre Guillaume Blanchard, Chartrettes (FR); Mathieu Dakowski, Noiseau (FR); Fabrice Marcel Noel Garin, Boissise la Bertrand (FR); Maurice Guy Judet, Dammarie les Lys (FR)

(73) Assignee: SNECMA, Paris (FR)

( * ) Notice: Subject to any disclaimer, the term of this patent is extended or adjusted under 35 U.S.C. 154(b) by 741 days.

(21) Appl. No.: 13/059,242

(22) PCT Filed: Aug. 25, 2009

(86) PCT No.: PCT/EP2009/060929
§ 371 (c)(1),
(2), (4) Date: May 12, 2011

(87) PCT Pub. No.: WO2010/023204
PCT Pub. Date: Mar. 4, 2010

(65) Prior Publication Data
US 2011/0206504 A1    Aug. 25, 2011

(30) Foreign Application Priority Data

Aug. 26, 2008    (FR) ..................................... 08 55732

(51) Int. Cl.
| | | |
|---|---|---|
| *F01D 1/02* | (2006.01) | |
| *F01D 5/08* | (2006.01) | |
| *F01D 9/04* | (2006.01) | |
| *F02C 7/28* | (2006.01) | |

(52) U.S. Cl.
CPC ........... *F01D 5/081* (2013.01); *F05B 2260/301* (2013.01); *F05D 2230/64* (2013.01); *Y02T 50/676* (2013.01); *F01D 9/042* (2013.01); *F02C 7/28* (2013.01); *Y02T 50/673* (2013.01); *Y02T 50/671* (2013.01)
USPC .................................... 415/209.2; 29/889.22

(58) Field of Classification Search
CPC ........... F01D 5/081; F01D 9/042; F02C 7/28; F05B 2260/301; F05D 2230/64; Y02T 50/671
USPC ........... 415/182.1, 183, 185, 189, 190, 209.2, 415/213.1, 214.1; 29/889.21, 889.22; 403/30, 336, 337, 408.1
See application file for complete search history.

(56) References Cited

U.S. PATENT DOCUMENTS 2,738,126 A * 3/1956 Edwards ........................ 416/215
4,725,199 A * 2/1988 Johnson ........................ 415/189

(Continued)

FOREIGN PATENT DOCUMENTS

| EP | 0 363 280 A1 | 4/1990 |
| EP | 1 657 406 A2 | 5/2006 |

(Continued)

OTHER PUBLICATIONS

U.S. Appl. No. 13/141,857, filed Jun. 23, 2011, Blanchard, et al.

(Continued)

*Primary Examiner* — Ned Landrum
*Assistant Examiner* — Alexander White
(74) *Attorney, Agent, or Firm* — Oblon, Spivak, McClelland, Maier & Neustadt, L.L.P.

(57) ABSTRACT

A stationary vane assembly for a turbine engine including an inner casing and at least two angular sectors forming a high-pressure guide vane assembly, each angular sector including a fastening tab for fastening the angular sector on the casing. The stationary vane assembly including a ring of abradable material fixed on the casing, on the side of a mobile vane assembly using a plurality of screw-nut assemblies, the stationary vane assembly also including radial retaining pins for the angular sectors introduced into first bores formed in the fastening tabs and in the mounting clip, the bores having axes substantially parallel to the longitudinal axis, the mounting clip being fixed on the casing by the same screw-nut assemblies as those fixing the ring of abradable material support on the casing.

15 Claims, 6 Drawing Sheets

(56) References Cited

U.S. PATENT DOCUMENTS

| | | | |
|---|---|---|---|
| 4,728,255 A * | 3/1988 | Kirkpatrick et al. | 415/119 |
| 5,007,800 A | 4/1991 | Hacault et al. | |
| 5,211,541 A * | 5/1993 | Fledderjohn et al. | 416/198 A |
| 5,372,476 A * | 12/1994 | Hemmelgarn et al. | 415/135 |
| 5,503,490 A * | 4/1996 | Melton | 403/28 |
| 5,839,878 A * | 11/1998 | Maier | 415/209.2 |
| 6,095,750 A * | 8/2000 | Ross et al. | 415/189 |
| 6,428,272 B1 * | 8/2002 | Pepi et al. | 416/96 R |
| 6,447,250 B1 | 9/2002 | Corrigan et al. | |
| 6,761,034 B2 * | 7/2004 | Niday et al. | 60/796 |
| 7,578,653 B2 * | 8/2009 | Klasing et al. | 415/115 |
| 2001/0011452 A1 | 8/2001 | Rau | |
| 2006/0099069 A1 | 5/2006 | Harding | |
| 2007/0110565 A1 | 5/2007 | Montgomery et al. | |
| 2007/0297900 A1 | 12/2007 | Abgrall et al. | |

FOREIGN PATENT DOCUMENTS

| | | |
|---|---|---|
| EP | 1 870 562 A3 | 12/2007 |
| FR | 2 907 499 A1 | 4/2008 |

OTHER PUBLICATIONS

U.S. Appl. No. 13/059,790, filed Feb. 18, 2011, Blanchard, et al.

International Search Report issued Dec. 3, 2009, in PCT/EP2009/060929.

French Preliminary Search Report issued Apr. 14, 2009, in French Patent Application No. FR0855732 with Engilsh translation of Category of cited documents.

* cited by examiner

FIXED VANE ASSEMBLY FOR A TURBINE ENGINE HAVING A REDUCED WEIGHT, AND TURBINE ENGINE COMPRISING AT LEAST ONE SUCH FIXED VANE ASSEMBLY

TECHNICAL FIELD AND BACKGROUND

The present invention relates to a fixed vane assembly of a turbine engine, said vane assembly comprising a ring of abradable material, and a turbine engine comprising at least one such vane assembly.

An airplane turbojet engine traditionally comprises a high-pressure compressor, a low-pressure compressor, a combustion chamber, a high-pressure turbine engine and a low-pressure turbine engine.

The compressor is intended to increase the pressure of the atmospheric air, the combustion chamber mixes the air that is compressed by the compressor with fuel and burns that mixture, the turbine, placed in the ejected flow, is then driven by that high-temperature gas flow. The turbine serves in particular to drive the compressors.

The compressors comprise rotor vanes and stationary guide vanes to guide the flow between the compression stages.

At the output of the combustion chamber, a stationary high-pressure guide vane assembly is provided, intended to rectify the hot gas flow leaving the combustion chamber before it comes into contact with the high-pressure turbine. This high-pressure guide vane assembly comprises a ring fixed on a casing, called the inner casing, and blades extending radially outwardly. The inner casing ensures the connection between the compressor and the turbine.

The guide vane assembly is made up of several sectors, each fixed on the inner casing.

Each sector comprises, traditionally, a platform from which blades extend radially outwardly and a fastening tab for fastening to the casing extends radially inwardly. The tab comprises two bores intended to be aligned with two bores of the inner casing provided on the side of the high pressure turbine, pins are inserted into these aligned bores, a flange is added downstream of the pins to retain them axially.

This type of turbojet engine is for example known from document FR 2 907 499.

This type of fixing is satisfactory. However, in the aeronautic field, there is a constant search to reduce the mass of the various components.

Moreover, the output of aeronautic engines depends in large part on the control of the gas flow between the fixed parts, such as the guide vane assembly, and the rotor parts, such as the high-pressure turbine. In order to have minimal play, a disc made from an abradable material is fixed on the stator. This ring is designed to ensure sealing with the turbine and to degrade and protect the blades of the turbine in case of accidental contact with the stator. The abradable materials for example have a honeycomb structure.

In document FR 2 907 499, the abradable material is supported by an abradable material support ring fixed on the case using a screw.

It is consequently one aim of the present invention to propose a fixed vane assembly for a turbine engine making it possible to reduce the total length of the turbine engine.

It is also an aim of the present invention to propose a stationary vane assembly of a turbine engine whereof the mass is reduced.

BRIEF DESCRIPTION OF THE INVENTION

The previously stated aim is achieved by a stationary vane assembly for a turbine engine comprising stationary vanes, a casing on which the stationary vanes are fixed, a ring made from an abradable material fixed on the casing on the rotor vane side, in which the stationary vanes are fixed on the casing via the fixing connection of the ring of abradable material on the casing. The number of parts required to carry out this stationary vane assembly is reduced, its mass is thereby decreased, as well as that of the turbine engine bearing it.

Moreover, the production is simplified since the number of parts to be assembled is reduced. The cost is thereby also decreased.

In other words, a single connection is used to assemble the ring of abradable material and the stationary vanes on the casing. In the case of a high-pressure guide vane assembly, the same mechanical connection is used to fix the ring of abradable material and the vanes of the guide vane assembly on the inner casing.

The present invention then relates mainly to a fixed vane assembly for a turbine engine with a longitudinal axis comprising a casing and at least two angular sectors provided with blades, said angular sectors being fixed on the casing, each angular sector comprising a platform from which at least one blade protrudes radially outwards and a fastening tab for fastening the angular sector on the casing, said fastening tab protruding from the platform radially inwards, the stationary vane assembly comprising a ring of abradable material supported by a support fixed on the casing on a rotor vane assembly side via a plurality of screw-nut assemblies, the fixed vane assembly also comprising pins for radial retention of the angular sectors introduced into first bores formed in the fastening tabs and the mounting clip; said bores having axes substantially parallel to the longitudinal axis, the mounting clip being fixed on the casing using the same screw-nut assemblies as those fixing the abradable material ring support on the casing.

In one embodiment, each pin comprises a skirt extending orthogonally to the axis of the pin radially outwards, said skirt axially delimiting a head and a tail, the head being received in a first bore of the mounting clip and the skirt bearing flat by one of its faces against the clip, so as to orient the axis of the pin orthogonally to the mounting clip.

In another embodiment, each pin comprises a portion with a smaller section and a portion with a larger section connected by a shoulder, the first bores each comprising an annular step against which said shoulder bears so as to prevent the radial retaining pins from moving axially away from the casing.

In another embodiment, each radial retaining pin comprises a first portion with a smaller section and a second portion with a larger section connected by a shoulder, said shoulder bearing against the periphery of a first bore of the mounting clip so as to prevent the pins from moving axially away from the casing.

It can be provided for each pin to be crimped by a first longitudinal end in the first bores of the mounting clip.

Advantageously, a second longitudinal end of the radial retaining pins is received in first bores of the casing, these bores advantageously not being through-bores. In one alternative, the pins can be provided to be crimped in first bores of the casing.

In one advantageous example, the mounting clip comprises second bores passed through by the screw-nut assemblies, the nuts being crimped in the second bores of the mounting clip. A means can then advantageously be provided for locking the nuts in rotation. The risk of losing the nuts is then very low.

The rotational locking is, for example, obtained with each nut comprising at least one flat section on its periphery and with the clip comprising a tab bordering each of the second bores, the flat section cooperating with the tab to prevent the rotation of the nut.

In one alternative embodiment, the nuts are formed by the mounting clip, for example by making tappings in the second bores of the clip.

Advantageously, protective shrouds are provided covering the heads of the fastening screws of the ring of abradable material.

The casing can be an inner casing and the angular sectors form a high-pressure turbine guide vane assembly, the mounting clip being positioned on a combustion chamber side.

The present invention also relates to a turbine engine comprising at least one fixed vane assembly according to the present invention.

BRIEF DESCRIPTION OF THE DRAWINGS

The present invention will be better understood using the following description and drawings, in which.

DETAILED DESCRIPTION OF THE INVENTION

The following description will provide a detailed description of a guide vane assembly for a high-pressure turbine; however, the invention is not limited to a high-pressure guide vane assembly, but rather applies to any fixed vane assembly for a turbine engine, for example a compressor guide vane assembly.

We will consider, for the description, the direction from left to right in FIG. 1, which corresponds to the flow direction of the gas flow, the left being designated by upstream and right being designated by downstream.

For simplification purposes, we will use the same references to designate elements having the same function and substantially the same structure in the various embodiments described. Moreover, we will refer to the ring made from abradable material as "ring of abradable material."

Figure 1A:
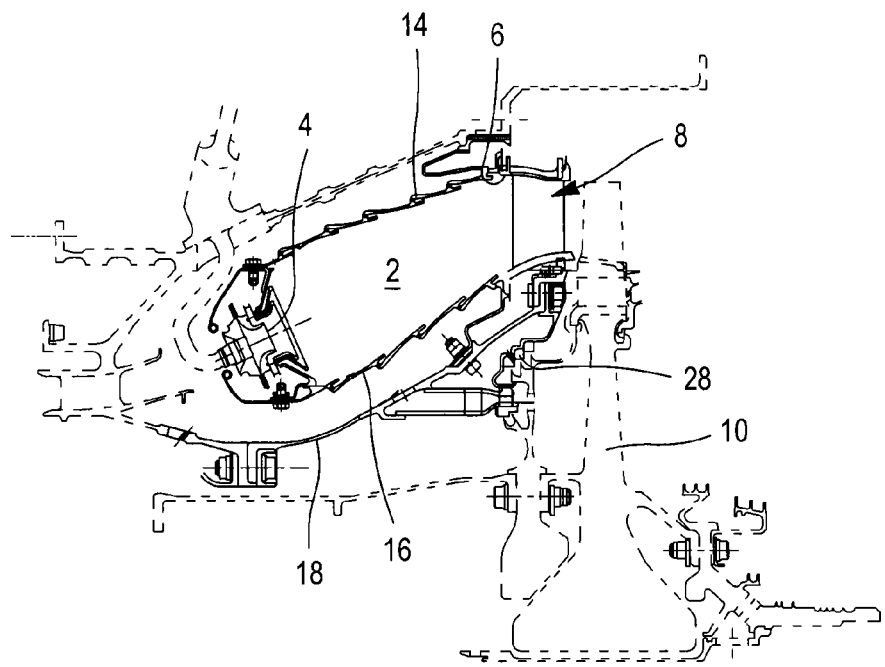
FIG. 1A is a longitudinal cross-sectional view of a portion of a turbojet engine according to the present invention at the combustion chamber and the high-pressure turbine.

FIG. 1A shows a detailed view of a turbojet engine according to the present invention with axis of revolution X. This turbojet engine in particular comprises a combustion chamber 2, provided upstream with an intake orifice 4 for air coming from the compressor (not shown), and an exhaust orifice 6 for combustion gases. The turbojet engine also comprises a high-pressure guide vane assembly 8 arranged downstream of the exhaust orifice 6, a high-pressure turbine 10 downstream of the guide vane assembly 8, the turbine 10 driving the compressor.

The combustion chamber 2 is made up of a radially outer enclosure 14 fixed on an outer casing and a radially inner enclosure 16 fixed on an inner casing 18, designated "inner casing." The inner casing has a shape of revolution around longitudinal axis X.

The guide vane assembly 8 is fixed on the inner casing 18. As shown in detail in FIG. 1B, the guide vane assembly 8 comprises blades 12 extending between a radially outer ring 9 and a radially inner ring 11. The blades 12 are arranged downstream of the exhaust orifice 6 on the flow path of the combustion gases, these blades 12 are intended to guide the gas flow leaving the combustion chamber 2 before being put in contact with the high-pressure turbine 10.

The guide vane assembly 8 is made up of at least two angular sectors 8.1 fixed separately on the inner casing 18. As an example, the guide vane assembly 8 comprises sixteen angular sectors 8.1 each provided with two blades.

The blades 12 extend radially outwards from a platform 20, forming a portion of the inner ring 11 of the guide vane assembly 8. A fastening tab 22 for fastening the platform 20 on the inner casing 18 protrudes radially towards the inside of the platform 20 on the opposite face of the platform 20 supporting the blades 12.

When all of the angular sectors 8.1 are fixed on the inner chamber, the platforms placed end to end form a continuous ring.

The angular sectors 8.1 are fixed on a downstream end portion 24 of the inner casing 18. In the illustrated example, the downstream end portion 24 of the inner casing 18 is made up, from upstream to downstream, of a tapered portion of revolution 24.1 whereof the end with the larger diameter is oriented in the downstream direction, a tubular portion 24.2 connected to the tapered portion, and an annular portion 24.3 connected to the tubular portion 24.2. The annular portion 24.3 is contained in a plane orthogonal to the longitudinal axis X.

The casing also comprises, between the tubular portion 24.2 and the annular portion 24.3, an annular protrusion 24.4 extending radially outwards, said protrusion 24.4 is provided at a distance from the annular portion 24.3, said distance being substantially equal to the thickness of the fastening tabs 22.

A ring of abradable material 26 is fixed on a support 28 via which the ring is secured to the inner casing 18.

The support 28 comprises a tubular portion 28.1 on the inner periphery of which the ring of abradable material 26 is fixed, and a tapered portion 28.2 downstream of the tubular portion 28.2 offering a conicity such that it is housed in the tapered portion 24.1 of the end portion 24 of the inner casing 18.

Figure 3:
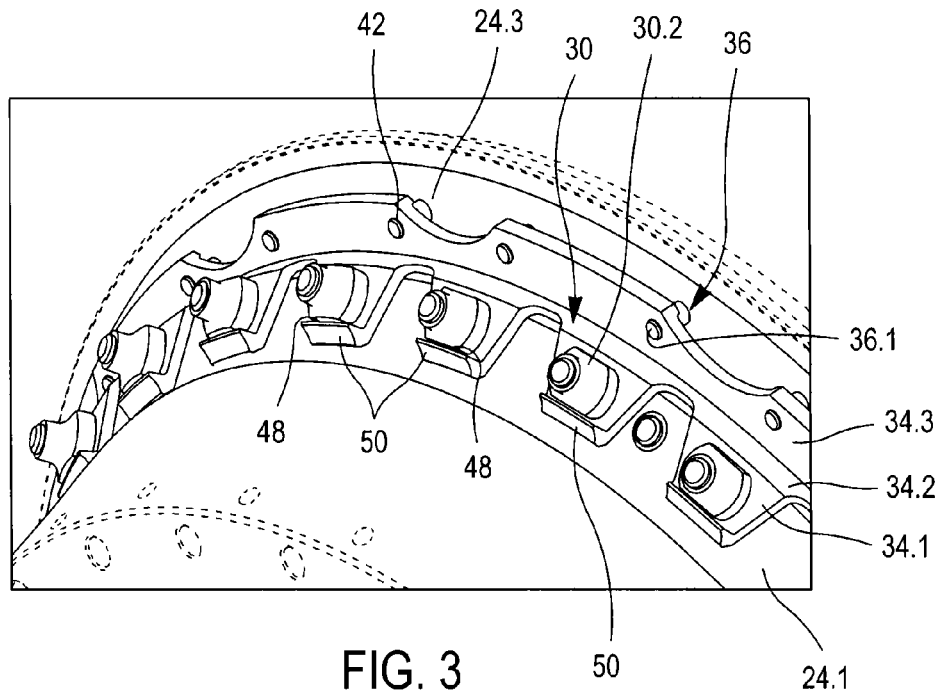
FIG. 3 is a perspective view of the inner casing from the combustion chamber.

The support 28 is fixed on the inner casing 18 using a screw-nut assembly 30 passing through the tapered portions 24.2 and 28.2 of the inner casing and the support 28, respectively. As shown in FIG. 3, screw-nut assemblies are distributed regularly all the way around the casing.

In the illustrated example, the heads of the screws 30.1 are on the radially inner side, i.e. of the tapered portion 28.2 of the support 28, and the nuts are on the radially outer side.

Advantageously, it is provided to cover the heads of the screws 30.1 with a protective shroud 32 to reduce the aerodynamic disruptions due to the screw heads, and to protect the screw heads from the high temperature.

According to the present invention, the angular sectors 8.1 of the guide vane assembly are fixed on the inner casing using screw-nut assemblies 30 serving to fix the ring of abradable material 26 on the inner casing 18.

More particularly, the angular sectors 8.1 are immobilized on the inner casing 18 between a piece 34 and the inner casing 18.

The piece 34 forms a mounting clip having a shape similar to the end portion 24 of the inner casing 18, and the dimensions of which are such that the clip can surround the end portion 24.

As a result, the mounting clip 34 comprises, from upstream to downstream, a tapered portion 34.1, a tubular portion 34.2 and an annular portion 34.3 arranged in a plane orthogonal to the longitudinal axis X. The tapered portion 34.1 outwardly covers the tapered portion 24.1 and is passed through by the screws 30.1, the tubular portion 34.2 outwardly covers the tubular portion 24.2, and the tubular portion 34.3 is in contact with an upstream face of the fastening tabs 22.

The annular portion 34.3 comprises, on its downstream face at its radially outer end, a ring 34.4 protruding in the downstream direction.

The fastening tabs are arranged between an upstream face of the annular portion 24.3 and the ring 34.4 of the mounting clip 34. These two faces limit the axial movement of the angular sections 8.1. Axial play is provided to allow the tilting of the high-pressure guide vane assembly during operation; during operation, the stresses from the gases press the high-pressure guide vane assembly in the downstream direction.

Moreover, according to the invention, the angular sectors 8.1 are radially held by using pins 36 extending parallel to the longitudinal axis between the annular portion 24.1 of the casing 18 and the annular portion 24.1 of the mounting clip and passing through the fastening tabs 22.

Figure 1B:
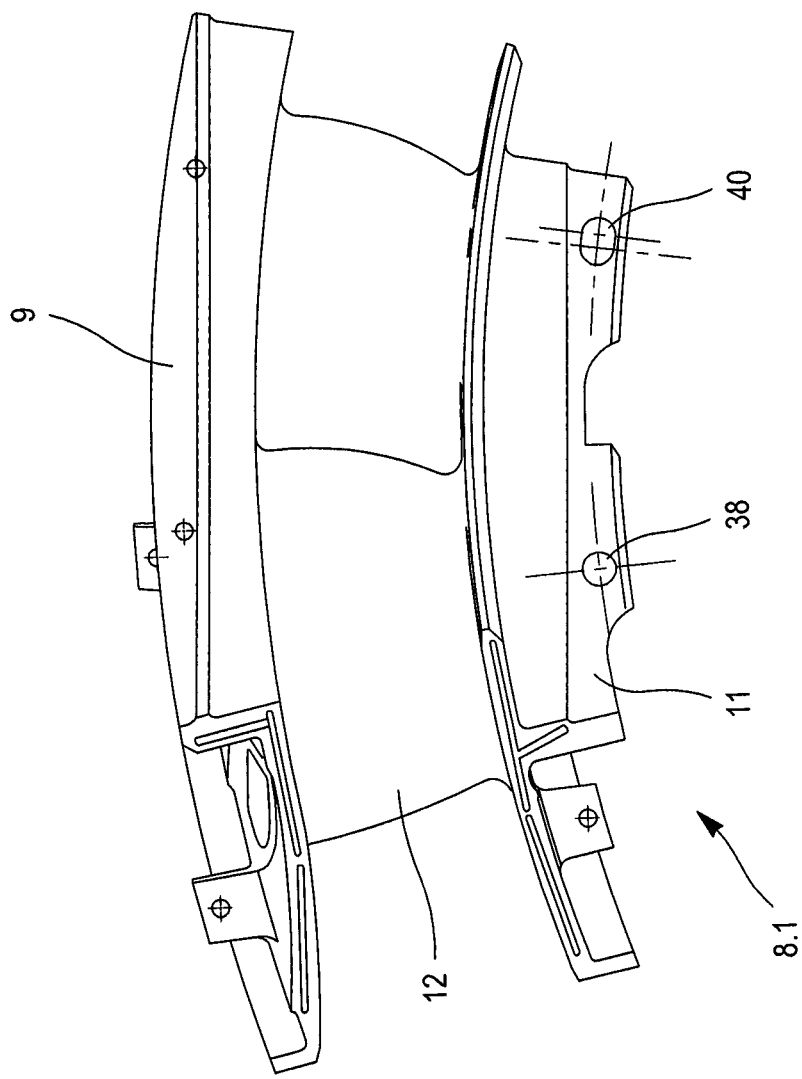
FIG. 1B is a front view of an angular sector of a guide vane assembly of a turbojet engine of FIG. 1A.

To that end, each fastening tab 22 comprises two through bores 38, 40, shown in FIG. 1B, formed on an arc of a circle portion centered on the axis X. One of the bores 38 has a circular section with a diameter substantially equal to that of the radial retaining pins 36 to allow them to be placed in the bore 38, and the other 40 has an oblong section whereof the larger dimension is oriented along the arc of the circle centered on the axis X, the smaller diameter being substantially equal to the diameter of the radial retaining pins 36. The implementation of a circular bore and an oblong bore allows assembly even in case of variation in the dimensions.

In the illustrated example, the pins 36 are received at their downstream end in non-through bores 41 formed in the upstream face of the annular portion 24.1 of the inner casing 18. This embodiment makes it possible both not to degrade the sealing between the two zones on either side of the inner chamber 18, which are at different pressures, and to ensure good rigidity of the connection between the angular sector and the inner casing.

Figure 4D:
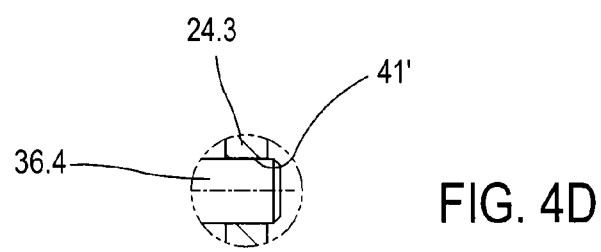
FIGS. 4C and 4D are detail views of FIG. 2 according to two alternative embodiments of the connection between the radial retaining pins and the inner casing.
Figure 4C:
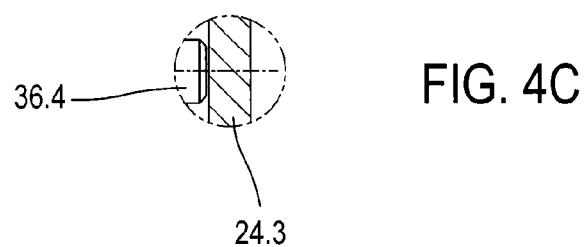

FIGS. 4C and 4D show alternatives of the connection between the inner casing 18 and the pins 36.

In FIG. 4C, the annular portion 24.3 comprises a planar upstream face, the free end of the tail 36.4 of the pin 36 is bearing against said face. This embodiment is very simple and does not damage the sealing.

In FIG. 4D, the annular portion 24.3 comprises a plurality of pairs of through bores 41' receiving the free end of the tail 36.4 of each pin 36, the number of pairs of bores 41' being equal to the number of angular guide vane assembly sectors to be fixed. This embodiment is easy to manufacture and ensures good rigidity of the connection between the angular sector and the inner casing.

Figure 2:
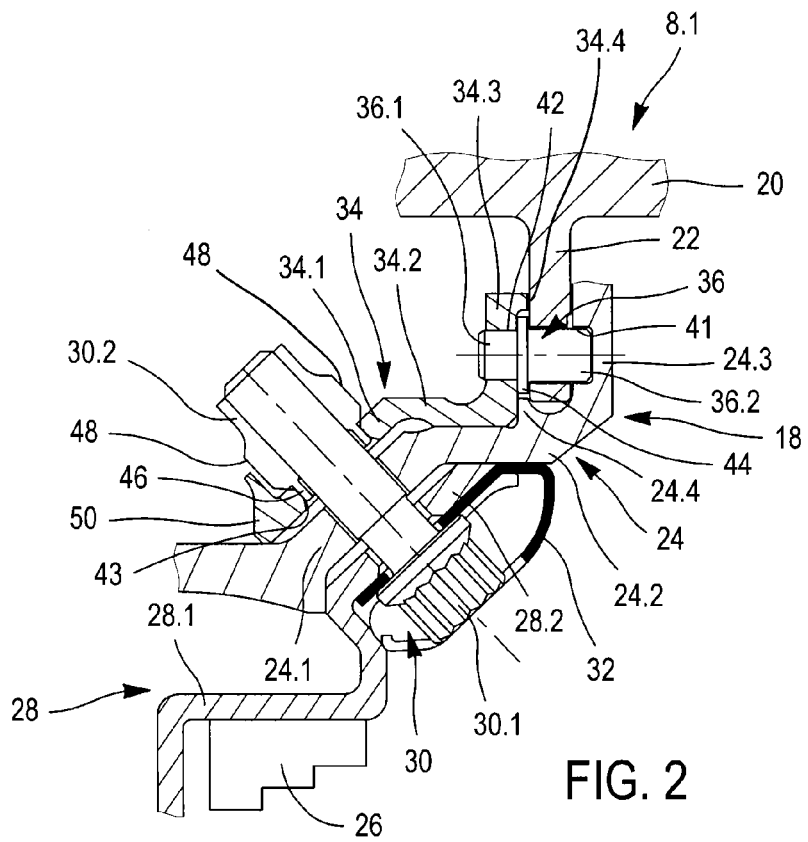
FIG. 2 is an enlarged view of FIG. 1 at the fastening of the high-pressure guide vane assembly on the inner casing.

In the example illustrated in FIG. 2, the annular portion 34.3 comprises through bores 42 with an axis parallel to the longitudinal axis X, and each passed through by a pin 36. There are as many pairs of pins as there are connections to be made between the angular sectors 8.1 and the inner casing 18.

In the example illustrated in FIG. 2, each pin 36 is crimped by a first longitudinal end in a bore 42. Advantageously, each pin 36 comprises a skirt 44 delimiting a head 36.1 on the upstream side and a tail 36.2 on the downstream side, the head 36.1 being crimped in the bores 42.

The skirt 44 makes it possible to orient the axis of the pin 36 orthogonally to the annular portion 34.3. Moreover, it forms an axial stop for the pin and fixes the length of the portion of the pin 36 or tail 36.2 protruding in the downstream direction.

In the case where the length of the head and the thickness of the mounting clip are sufficient to ensure the perpendicularity of the pin relative to the clip, and to form an axial stop for the pins, such a skirt can be omitted.

Instead of crimping the heads 36.1 in the bores 42, it can be provided to form threaded heads 36.1 with a sufficient length for them to protrude from the bores 42 in the upstream direction, and to screw nuts on each of the heads, these nuts then advantageously being crimped in the bores 42.

It is also possible to consider crimping the pins in the annular portion 24.3 of the casing and not in the clip 24. This alternative has the advantage of simplifying repairs since, when the clip is removed, the angular sectors 8.1 remain on the casing, supported by the pins.

It is also possible to consider using pins each provided with a skirt and that are mounted with play both in the casing and in the clip.

Figure 4A:
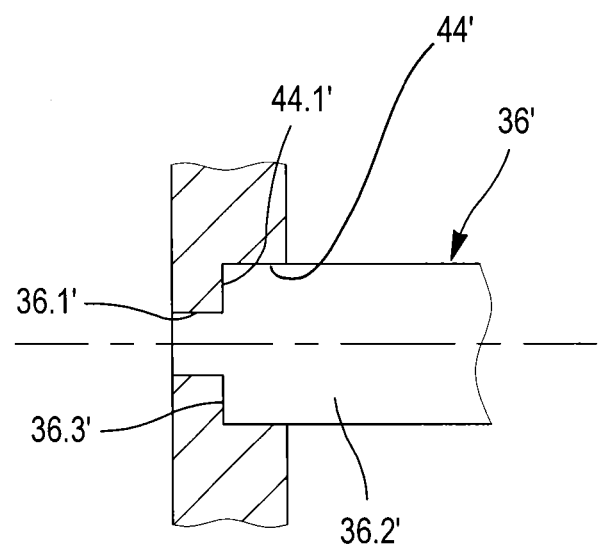
FIGS. 4A and 4B are detail views of FIG. 2 according to two alternative embodiments of the connection between the radial retaining pins of the angular sectors and the mounting clip.
Figure 4B:
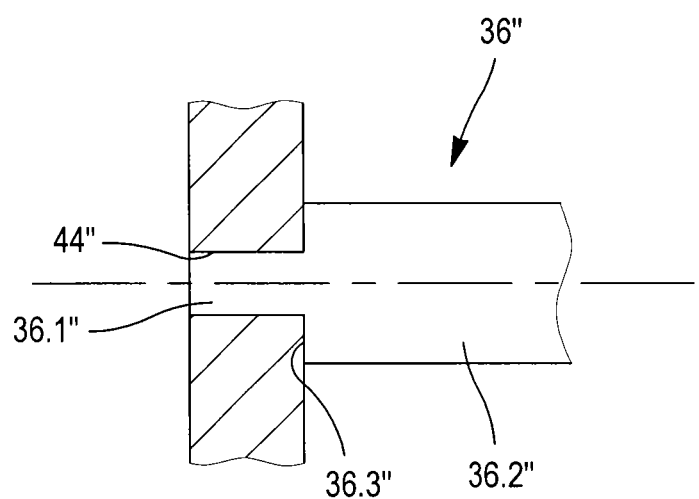

FIGS. 4A and 4B show other embodiments to axially stop the pins.

In FIG. 4A, the bores 44' comprise two portions with different diameters connected by an annular step 44.1' oriented in the downstream direction, and the upstream end of the pin 36' comprises a portion with a smaller diameter 36.1' and a portion with a larger diameter 36.2' connected by a shoulder 36.3', the shoulder being pressed against the annular step, and axially stopping the pins.

In FIG. 4B, the pins 36" comprise a portion with a smaller diameter 36.1" and a portion with a larger diameter 36.2" connected by a shoulder 36.3" and axially stopping the pins, the shoulder being pressed against the downstream face of the annular portion 34.3, the diameter of the bores 44" being substantially equal to that of the portion with the smaller diameter 36.1".

The nuts 30.2 are advantageously crimped on the mounting clip. In the illustrated example, the tapered portion 34.1 of the clip 34 comprises bores 43 passed through by the screws. The bores 43 offer a larger diameter than that of the screws 30.1, and the nuts comprise a crimping skirt 46 bordering the ends of the nuts oriented on the side of the bores 43. The crimping skirts 46 each penetrate a bore between the edge of the orifice and the screw, these skirts 46 being deformed to perform the crimping.

Also advantageously provided is a rotational stop of the nuts 30.2. To that end, the nuts comprise at least one flat section 48 on their outer peripheries, advantageously two, to simplify the orientation of the nuts, the tapered portion 34.1 comprising tabs 50 bordering each of the orifices, cooperating with a flat section to prevent the rotation of the nuts.

Thus, owing to the crimping and the rotational stop, the nuts cannot unscrew themselves and separate from the nuts. The risk of accidentally losing a screw-nut assembly is therefore very low. It is understood that the assembly using standard nuts is within the scope of the present invention.

FIG. 3 shows a view of the clip of the upstream side, advantageously the tapered portion 34.1 is scalloped, the scallops comprising the bores 42 and being passed through by the screws 30.1. This scalloping makes it possible to reduce the mass of the clip. Likewise, the annular portion 34.1 is also scalloped between the pairs of bores receiving the pairs of pins passing through an angular sector.

Moreover, this open form makes it possible to have greater elasticity for mounting and makes it possible to pick up some play, as will be seen below.

We will now explain the mounting of the angular sections of the guide vane assembly on the inner casing 18.

The angular sectors are slipped on the pins 36 fixed on the mounting clip 34.

The mounting clip 34 thus equipped is brought axially closer to the inner casing until the pins 36 penetrate the non-through bores 41.

The nuts 30.2 are placed on the tapered portion 34.1 at the orifices, the flat section 48 being in contact with the tab 50.

The ring of abradable material is then placed inside the inner casing 18, such that the tapered portion bears on the inner face of the tapered portion 24.1 of the inner casing 18. A protective shroud can be added.

The screws 30.1 are then inserted through the inside of the inner casing 18 and pass through the abradable material support, the casing 18 and the mounting clip.

The screws 30.1 are then screwed into the nuts 30.2.

As a result, a single screw-nut assembly 30 is used to simultaneously assemble the ring of abradable material and the angular sectors. The vane assembly is then simplified and lightened, and the manufacturing time is reduced.

Advantageously, the jackets of the clip can be used to reinforce the bearing of the clip on the fastening tabs 22.

Figure 5A:
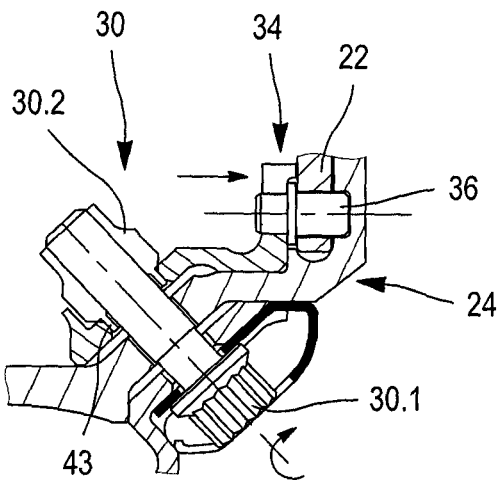
FIGS. 5A to 5C are views identical to FIG. 2 in different assembly positions.
Figure 5B:
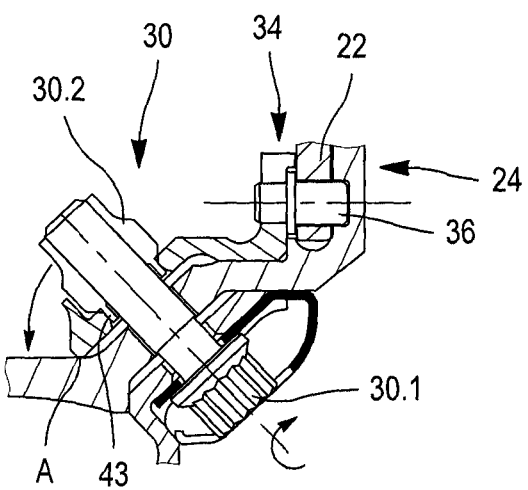
Figure 5C:
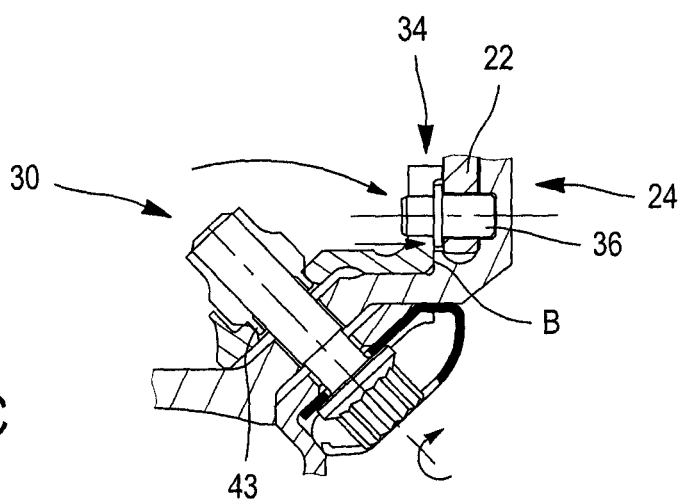

FIGS. 5A to 5C show the evolution of the play between the different parts during tightening of the screws.

During the assembly of the pieces of the stationary vane assembly, the centering of the mounting clip on the casing 18 is obtained by the pins 30. The tubular portion 34.2 of the mounting clip is then placed abutting on the tubular portion 24.2 of the casing 18, and the protective shroud on the tubular portion 24.2 of the casing 18.

The screws 30.1 are then screwed into the nuts 30.2, which causes the tilting of the scallops of the clip towards the casing, until the edges of the scallops come into contact with the casing, position designated by letter A.

The tightening of the screws is then continued until the necessary torque value, which, by reaction, puts the downstream face of the annular portion 34.3 of the clip in contact against the annular protrusion of the casing, designated by letter B. This recapturing of play is facilitated by the greater elasticity of the open mounting clip.

Figure 6:
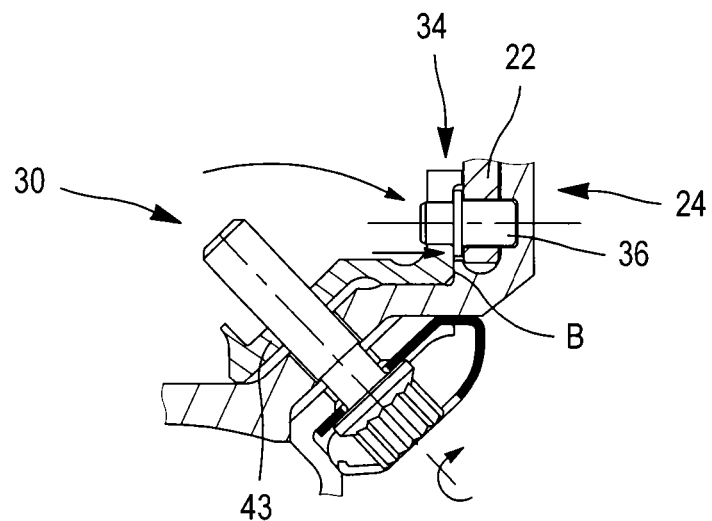
FIG. 6 is a detailed view of another embodiment at the fastening of the high-pressure guide vane assembly on the inner casing.

It could be considered not to use nuts and to screw the screws directly into the clip by making tapped bores in the clip, the tappings being directly machined in the clip, as shown in FIG. 6, or attached in the form of inserts.

It is understood that the particular forms of the casing and the mounting clip are in no way limiting, and that a profile without a tapered portion could be considered.

The invention claimed is:

1. A stationary vane assembly for a turbine engine with a longitudinal axis comprising:
   a casing;
   at least two angular sectors comprising blades, the angular sectors being fixed on a downstream end portion of the casing, each angular sector comprising a platform from which at least one blade protrudes radially outwards and a fastening tab for fastening the angular sector on the casing, the fastening tab protruding from the platform radially inwards;
   a ring of abradable material supported by a support fixed on the downstream end portion of the casing on a rotor vane assembly side via a plurality of screw-nut assemblies passing through the support of the ring of abradable material; and
   pins for radial retention of the angular sectors introduced into first bores formed in the fastening tabs and into second bores provided in a mounting clip situated opposite the ring of abradable material relative to the downstream end portion of the casing, the mounting clip defining, with the downstream end portion of the casing, a groove in which the fastening tabs are arranged, the first and second bores having axes substantially parallel to the longitudinal axis, the mounting clip being fixed on the casing using the same screw-nut assemblies as the screw-nut assemblies fixing the abradable material ring support on the casing,
   wherein the mounting clip comprises, from upstream to downstream, a tapered portion, a tubular portion, and an annular portion arranged in a plane orthogonal to the longitudinal axis, a downstream end of the tapered portion of the mounting clip having a larger diameter than an upstream end of the tapered portion of the mounting clip,
   wherein the downstream end portion of the casing comprises, from upstream to downstream, a tapered portion, a tubular portion, and an annular portion, a downstream end of the tapered portion of the downstream end portion of the casing having a larger diameter than an upstream end of the tapered portion of the downstream end portion of the casing, and the annular portion of the downstream end portion of the casing being substantially perpendicular to the longitudinal axis,
   wherein the annular portion of the mounting clip and the annular portion of the downstream end portion of the casing define the groove in which the fastening tabs are arranged, and
   wherein the screw-nut assemblies pass through bores disposed on the tapered portion of the mounting clip and the tapered portion of the downstream end portion of the casing.

2. The stationary vane assembly according to claim 1, wherein each pin comprises a skirt extending orthogonally to an axis of the pin radially outwards,
   the skirt axially delimiting a head and a tail, the head being received in one of the first bores of the mounting clip and a face of the skirt bearing flat against the mounting clip, so as to orient the axis of the pin orthogonally to the mounting clip.

3. The stationary vane assembly according to claim 1, wherein each pin comprises a first portion with a smaller section and a second portion with a larger section connected by a shoulder, the first bores of the mounting clip each comprising an annular step against which the shoulder bears so as to prevent the radial retaining pins from moving axially away from the casing.

4. The stationary vane assembly according to claim 1, wherein each radial retaining pin comprises a first portion with a smaller section and a second portion with a larger section connected by a shoulder, the shoulder bearing against the periphery of one of the first bores of the mounting clip so as to prevent the pins from moving axially away from the casing.

5. The stationary vane assembly according to claim 1, wherein each pin is crimped by a first longitudinal end in the first bores of the mounting clip.

6. The stationary vane assembly according to claim 5, further comprising protective shrouds covering heads of fastening screws of the screw-nut assemblies of the ring of abradable material.

7. The stationary vane assembly according to claim 5, wherein the casing is an inner casing and the angular sectors form a high-pressure turbine guide vane assembly, the mounting clip being positioned on a combustion chamber side.

8. The stationary vane assembly according to claim 1, wherein a second longitudinal end of the radial retaining pins is received in first bores of the casing, the bores not being through-bores.

9. The stationary vane assembly according to claim 8, wherein the pins are crimped in first bores of the casing.

10. The stationary vane assembly according to claim 1, wherein the mounting clip comprises second bores passed through by the screw-nut assemblies, nuts of the screw-nut assemblies being crimped in the second bores of the mounting clip.

11. The stationary vane assembly according to claim 10, further comprising a device for locking the nuts in rotation.

12. The stationary vane assembly according to claim 11, wherein each nut comprises at least one flat section on its periphery and the mounting clip comprises a tab bordering each of the second bores, the flat section cooperating with the tab to prevent rotation of the nut.

13. The stationary vane assembly according to claim 10, wherein the nuts are formed by the mounting clip by making tappings in the second bores of the clip.

14. The stationary vane assembly according to claim 1, wherein the second bores of the mounting clip are disposed in the annular portion of the mounting clip.

15. A turbine engine comprising at least one stationary vane assembly according to claim 1.

* * * * *